(12) United States Patent
Ham

(10) Patent No.: US 12,263,748 B2
(45) Date of Patent: Apr. 1, 2025

(54) CENTRAL CONTROL CHARGING SYSTEM, METHOD, AND APPARATUS BASED ON BIG DATA

(71) Applicant: SK SIGNET INC., Jeollanam-do (KR)

(72) Inventor: Jae Uk Ham, Jeollanam-do (KR)

(73) Assignee: SK SIGNET INC., Yeonggwang-gun Jeollanam-do (KR)

( * ) Notice: Subject to any disclaimer, the term of this patent is extended or adjusted under 35 U.S.C. 154(b) by 0 days.

(21) Appl. No.: 18/589,425

(22) Filed: Feb. 28, 2024

(65) Prior Publication Data

US 2024/0198840 A1   Jun. 20, 2024

Related U.S. Application Data

(63) Continuation of application No. PCT/KR2022/013043, filed on Aug. 31, 2022.

(30) Foreign Application Priority Data

Sep. 1, 2021 (KR) .................. 10-2021-0116278
Jun. 2, 2022 (KR) .................. 10-2022-0067510
(Continued)

(51) Int. Cl.
*B60L 53/65* (2019.01)
*B60L 53/62* (2019.01)
(Continued)

(52) U.S. Cl.
CPC .............. *B60L 53/65* (2019.02); *B60L 53/62* (2019.02); *B60L 53/665* (2019.02); *B60L 53/67* (2019.02);
(Continued)

(58) Field of Classification Search
CPC ........ B60L 53/65; B60L 53/62; B60L 53/665; B60L 53/67; B60L 53/68; B60L 53/53; B60L 2240/80; B60L 2260/46
See application file for complete search history.

(56) References Cited

U.S. PATENT DOCUMENTS

| | | | | |
|---|---|---|---|---|
| 2010/0079004 A1* | 4/2010 | Keefe | ............... | B60L 53/63 |
| | | | | 307/80 |
| 2012/0200256 A1* | 8/2012 | Tse | .................. | B60L 53/14 |
| | | | | 320/109 |

(Continued)

FOREIGN PATENT DOCUMENTS

| DE | 102018113694 A1 * | 12/2019 |
|---|---|---|
| JP | 2018206438 A | 12/2018 |

(Continued)

OTHER PUBLICATIONS

Machine translation of DE-102018113694-A1 (Year: 2024).*
(Continued)

*Primary Examiner* — David V Henze-Gongola
(74) *Attorney, Agent, or Firm* — ZION IP; Byungwoong Park

(57) ABSTRACT

A big data based central control charging system according to the present includes an electric vehicle charging unit which charges an electric vehicle using a plurality of charging modules; and a central control unit which collects state-of-charge data by performing the communication with the electric vehicle, by means of the electric vehicle charging unit, the central control unit converts state-of-charge data received from the electric vehicle, by means of the electric vehicle charging unit into big data, extracts a feature item for every electric vehicle model and a data value of the feature item by analyzing and learning the big data of the state-of-charge data, builds or updates a vehicle model (Continued)

identification model for identifying the electric vehicle model based on the extracted feature item and the feature item data value.

20 Claims, 10 Drawing Sheets

(30) Foreign Application Priority Data

Jun. 2, 2022 (KR) .................. 10-2022-0067512
Jun. 2, 2022 (KR) .................. 10-2022-0067513

(51) Int. Cl.
*B60L 53/66* (2019.01)
*B60L 53/67* (2019.01)
*B60L 53/68* (2019.01)

(52) U.S. Cl.
CPC .......... *B60L 53/68* (2019.02); *B60L 2240/80* (2013.01); *B60L 2260/46* (2013.01)

(56) References Cited

U.S. PATENT DOCUMENTS

| | | | | |
|---|---|---|---|---|
| 2015/0291047 | A1* | 10/2015 | Saito | B60L 53/30 |
| | | | | 320/109 |
| 2019/0084435 | A1* | 3/2019 | Grace | H01M 10/441 |
| 2019/0263286 | A1* | 8/2019 | Metzger | B60L 53/65 |
| 2021/0295610 | A1* | 9/2021 | Lee | G06Q 20/145 |

FOREIGN PATENT DOCUMENTS

| | | |
|---|---|---|
| KR | 20150046421 A | 4/2015 |
| KR | 101676689 B1 | 11/2016 |
| KR | 20210013965 A | 2/2021 |
| KR | 102267043 B1 | 6/2021 |
| KR | 102406394 B1 | 6/2022 |

OTHER PUBLICATIONS

International Search Report for PCT/KR2022/013043, Dec. 5, 2022.
PCT Written Opinion of the International Searching Authority, Dec. 5, 2022.

* cited by examiner

```
ChargeParameterDiscoveryReq data:
            SessionID=4f 32 30 34 38 32 34 37
              EVRequestedEnergyTransferType=3
              EVChargeParameter:
              EVChargeParameter:
              EVStatus:
                            EVReady=0
                            EVRESSSOC=66
                            EVErrorCode=0
                            EVRESSConditioning=0
                            EVCabinConditioning=0
              EVMaximumCurrentLimit=1500 (3 -1)      ⎯ 420
              EVMaximumPowerLimit=900 (7 2)
              EVMaximumVoltageLimit=4500 (5 -1)
              EVEnergyCapacity=22800 (9 0)
              EVEnergyRequest=20800 (9 0)
              FullSOC=100
              BulkSOC=80
ChargeParameterDiscoveryRes data:
            SessionID=4f 32 30 34 38 32 34 37
              ResponseCode=0
              EVSEProcessing=0
              EVSEStatus:
                            EVSEIsolationStatus=1
                            EVSEStatusCode=1
                            EVSENotification=None_EVSENotificationType
                            NotificationMaxDelay=0
              EVSEMaximumCurrentLimit=2000 (3 -1)
              EVSEMaximumPowerLimit=80 (7 3)
              EVSEMaximumVoltageLimit=4500 (5 -1)
              EVSEMinimumCurrentLimit=50 (3 -1)
              EVSEMinimumVoltageLimit=2000 (5 -1)
              EVSECurrentRegulationTolerance=20 (3 -1)
              EVSEPeakCurrentRipple=20 (3 -1)
              EVSEEnergyToBeDelivered=250 (9 3)
              SAScheduleList:
                            Tuple#1:
                            SAScheduleTupleID=10:
                                          Entry#1:
                                                        PMax=80
                                                        Start=0
                                                        Duration=86400
[38:33:698936]<EVSE> --> ChargeParameterDiscovery
```

FIG. 4

```
[38:33:449750]<EVSE> <-- ContractAuthentication
ContractAuthenticationReq data:
        SessionID=4f 32 30 34 38 32 34 37      —920
ContractAuthenticationRes data:
        SessionID=4f 32 30 34 38 32 34 37
          ResponseCode=0
[38:33:457562]<EVSE> --> ContractAuthentication
```
910

FIG. 9

CENTRAL CONTROL CHARGING SYSTEM, METHOD, AND APPARATUS BASED ON BIG DATA

TECHNICAL FIELD

The present disclosure proposes a big data based central control charging system, method, and apparatus.

BACKGROUND ART

FIG. 1 illustrates an electric vehicle charging system of the related art.

Referring to FIG. 1, an electric vehicle charging system of the related art is configured to include a plurality of dispensers DP and a server 110 controlling the same. In the electric vehicle charging system of the related art, the individual dispenser DP performs a power sharing operation by directly and individually selecting/determining a charging module to be used based on its own power bank state, a charging module usage state of the other dispenser, and an unused charging module state. Further, in the electric vehicle charging system of the related art, a server 110 mainly performs an operation of collecting charging information by communicating with an electric vehicle and a charger according to a communication protocol called an open charge point protocol (OCPP).

The electric vehicle charging system of the related art has a problem in that the power sharing operation is determined by an individual dispenser based on a usage state of the other dispenser and the charging module immediately before charging so that a flexible power sharing operation according to the change in the charging state is not possible.

For example, when the first dispenser DP1 was fully charged while charging the electric vehicle using four charging modules in a first dispenser DP1, three charging modules in a second dispenser DP2, and two charging modules in a third dispenser DP3, in the electric vehicle charging system of the related art, there was no clear criterion of whether to allocate the fully charged four charging modules to the second dispenser DP2 or the third dispenser DP3. As a result, the four fully charged charging modules were not flexibly allocated to the other dispenser DP so that there was a problem in that the charging efficiency was significantly degraded.

Moreover, the server 110 simply operated only to collect charging information from the charger or the electric vehicle, but there was a problem in that the collected charging information was not analyzed and learned to extract significant charging/payment pattern/information related to the charging. Further, there was a problem in that the server could not recognize/identify a vehicle model of the electric vehicle which was being currently charged so that it was difficult to apply a charging method suitable for the characteristic of the vehicle model.

SUMMARY

Technical Problem

The present invention has been made to solve the above-described problems and an object of the present invention is to provide a big data based central control charging system, method, and apparatus which enable a flexible power sharing operation by a centrally controlled method to remarkably improve the charging efficiency and speed.

Another object of the present invention is to provide a big data based central control charging system, method, and apparatus which learn and analyze data collected during the charging to build a vehicle model identification model to provide a customized charging method for every vehicle model, thereby greatly improving the charging efficiency.

Still another object of the present invention is to provide a big data based central control charging system, method, and apparatus which are capable of distinguishing electric vehicle identification information from data collected during the charging to collect charging and payment information for every individual electric vehicle and analyze a pattern and provide a charging and payment service customized for each user based on the analysis result.

Technical Solution

According to an exemplary embodiment of the present invention, a big data based central control charging system includes: an electric vehicle charging unit which charges an electric vehicle using a plurality of charging modules; and a central control unit which collects state-of-charge data by performing the communication with the electric vehicle, by means of the electric vehicle charging unit, the central control unit converts state-of-charge data received from the electric vehicle, by means of the electric vehicle charging unit, into big data, extracts a feature item for every electric vehicle model and a data value of the feature item by analyzing and learning the big data of the state-of-charge data, builds or updates a vehicle model identification model for identifying the electric vehicle model based on the extracted feature item and the feature item data value, selects state-of-charge data of the same vehicle model, among the big data of the state-of-charge data, compares the selected state-of-charge data for every electric vehicle to extract different identification items, and may store charging and payment information for every electric vehicle in the database by matching an identification data value of an identification item for every electric vehicle.

The feature item may include an item for at least one of a maximum current limit of the electric vehicle, a maximum voltage limit, a maximum power limit, a scale value for the above value, an identifier (ID) arrangement method, a bulk state of charge (SoC), a full SoC, a variance of a target current to the SoC, a variance of a target current according to a temperature, a variance of a target current according to a state of health (SoH), and a message transmission speed for every communication step.

The central control unit receives sample state-of-charge data for a specific electric vehicle model as the state-of-charge data, extracts a feature item for the vehicle model and a data value of the feature item by performing machine-learning based data mining on the sample state-of-charge data, and may reflect the extracted feature item and feature item data value to build or update a vehicle model identification model as a criterion for identifying the specific electric vehicle model.

The identification item of the vehicle may correspond to a media access control (MAC) address of the electric vehicle.

The charging information of the electric vehicle includes at least one of a charging station location in which the electric vehicle is charged, an average charging amount of the electric vehicle, a maximum charging amount, a minimum charging amount, an average charging time, a minimum charging time, a maximum charging time, a charging period, the number of times, and date, and the payment information of the electric vehicle may include at least one of a payment card used for payment for charging of the electric vehicle, a payment account, payment method information, and user information.

When a payment method for the electric vehicle is set to an automatic payment method, the central control unit may automatically make a payment for a charging cost based on the payment information when the electric vehicle is fully charged.

The central control unit predicts at least one of a next charging timing and a charging station of the electric vehicle based on the charging information and may transmit a notification regarding a congestion level of a predicted charging station to the electric vehicle or a user device at a predetermined time earlier than a predicted charging timing.

The congestion level may be derived based on usage state prediction of the plurality of charging modules at the predicted charging timing.

According to another aspect of the present disclosure, a big data based central control charging system may include: an electric vehicle charging unit which charges an electric vehicle using a plurality of charging modules; and a central control unit which collects state-of-charge data by performing the communication with the electric vehicle, by means of the electric vehicle charging unit, the central control unit converts state-of-charge data received from the electric vehicle, by means of the electric vehicle charging unit, into big data, extracts a feature item for every electric vehicle model and a data value of the feature item by analyzing and learning the big data of the state-of-charge data, builds or updates a vehicle model identification model for identifying the electric vehicle model based on the extracted feature item and the feature item data value, when a plurality of electric vehicles is connected to the electric vehicle charging unit to start the charging after building the vehicle model identification model, the central control unit collects state-of-charge data by performing the communication with the plurality of electric vehicles, extracts the feature item and the feature item data value from the state-of-charge data to input the feature item and the feature item data value to the vehicle model identification model, recognizes vehicle models of the plurality of electric vehicles according to a vehicle model identification result output from the vehicle model identification model, and may control the charging for the plurality of electric vehicles by applying a variance of a target current to SoC which is defined in advance for each recognized vehicle model to the electric vehicle charging unit.

The feature item may include an item for at least one of a maximum current limit of the electric vehicle, a maximum voltage limit, a maximum power limit, a scale value for the above value, an identifier (ID) arrangement method, a bulk state of charge (SoC), a full SoC, a variance of a target current for the SoC, a variance of a target current according to a temperature, a variance of a target current according to a state of health (SoH), and a message transmission speed for every communication step.

The central control unit receives sample state-of-charge data for a specific electric vehicle model as the state-of-charge data, extracts a feature item for the vehicle model and a data value of the feature item by performing machine-learning based data mining on the sample state-of-charge data, and may reflect the extracted feature item and feature item data value to build or update a vehicle model identification model as a criterion for identifying the specific electric vehicle model.

The central control unit may perform a power sharing operation by dynamically allocating the plurality of charging modules for every electric vehicle according to a variance of the target current to SoC which is defined in advance for every vehicle model of the plurality of electric vehicles.

The charging control for each of the plurality of electric vehicles is performed only when a variance of a target current to SoC which is defined in advance for every recognized vehicle model satisfies a predetermined condition and the predetermined condition may be applied only when a target current value in a SoC initial period is lower than a target current value in SoC mid and late periods.

According to an exemplary embodiment of the present invention, a charging control method of a central control unit may include receiving state-of-charge data from an electric vehicle connected to an electric vehicle charging unit, by means of the electric vehicle charging unit; converting the received state-of-charge data into big data; extracting a feature item for every electric vehicle model and a data value of the feature item by analyzing and learning the big data of the state-of-charge data; building or updating a vehicle model identification model for identifying the electric vehicle model based on the extracted feature item and the feature item data value; collecting state-of-charge data by performing communication with a plurality of electric vehicles when the plurality of electric vehicles is connected to the electric vehicle charging unit to start the charging after building the vehicle model identification model; extracting the feature item and the feature item data value from the state-of-charge data to input the feature item and the feature item data value to the vehicle model identification model; recognizing vehicle models of the plurality of electric vehicles according to a vehicle model identification result output from the vehicle model identification model; and controlling the charging for the plurality of electric vehicles by applying a variance of a target current to SoC which is defined in advance for each recognized vehicle model to the electric vehicle charging unit.

The feature item may include an item for at least one of a maximum current limit of the electric vehicle, a maximum voltage limit, a maximum power limit, a scale value for the above value, an identifier (ID) arrangement method, a bulk state of charge (SoC), a full SoC, a variance of a target current to the SoC, a variance of a target current according to a temperature, a variance of a target current according to a state of health (SoH), and a message transmission speed for every communication step.

According to an exemplary embodiment of the present invention, a charging control method of a central control unit may include receiving sample state-of-charge data for a specific electric vehicle model as the state-of-charge data; extracting a feature item for the vehicle model and a data value of the feature item by performing machine-learning based data mining on the sample state-of-charge data; and reflecting the extracted feature item and feature item data value to build or update a vehicle model identification model as a criterion for identifying the specific electric vehicle model.

According to an exemplary embodiment of the present invention, a charging control method of a central control unit may include performing a power sharing operation by dynamically allocating the plurality of charging modules for every electric vehicle according to a variance of the target current to SoC which is defined in advance for every vehicle model of the plurality of electric vehicles.

The controlling of charging for each of the plurality of electric vehicles is performed only when a variance of a target current to SoC which is defined in advance for every recognized vehicle model satisfies a predetermined condition and the predetermined condition may be applied only when a target current value in a SoC initial period is lower than a target current value in SoC mid and late periods.

According to another exemplary embodiment of the present invention, a charging control method of a central control unit may include receiving state-of-charge data from an electric vehicle connected to an electric vehicle charging unit, by means of the electric vehicle charging unit; converting the received state-of-charge data into big data; extracting a feature item for every electric vehicle model and a data value of the feature item by analyzing and learning the big data of the state-of-charge data; building or updating a vehicle model identification model for identifying the electric vehicle model based on the extracted feature item and the feature item data value; selecting state-of-charge data of the same vehicle model, among the big data of the state-of-charge data; comparing the selected state-of-charge data for every electric vehicle to extract different identification items; and storing charging and payment information for every electric vehicle in the database by matching an identification data value of an identification item for every electric vehicle.

The feature item may include an item for at least one of a maximum current limit of the electric vehicle, a maximum voltage limit, a maximum power limit, a scale value for the above value, an identifier (ID) arrangement method, a bulk state of charge (SoC), a full SoC, a variance of a target current to the SoC, a variance of a target current according to a temperature, a variance of a target current according to a state of health (SoH), and a message transmission speed for every communication step.

According to another exemplary embodiment of the present invention, a charging control method of a central control unit may include receiving sample state-of-charge data for a specific electric vehicle model as the state-of-charge data; extracting a feature item for the vehicle model and a data value of the feature item by performing machine-learning based data mining on the sample state-of-charge data; and reflecting the extracted feature item and feature item data value to build or update a vehicle model identification model as a criterion for identifying the specific electric vehicle model.

The identification item of the vehicle may correspond to a media access control (MAC) address of the electric vehicle.

The charging information of the electric vehicle may include at least one of a charging station location in which the electric vehicle is charged, an average charging amount of the electric vehicle, a maximum charging amount, a minimum charging amount, an average charging time, a minimum charging time, a maximum charging time, a charging period, the number of times, and date, and the payment information of the electric vehicle may include at least one of a payment card used for payment for charging of the electric vehicle, a payment account, payment method information, and user information.

According to another exemplary embodiment of the present invention, a charging control method of a central control unit may include when a payment method for the electric vehicle is set to an automatic payment method, automatically making a payment for a charging cost based on the payment information when the electric vehicle is fully charged.

According to another exemplary embodiment of the present invention, a charging control method of a central control unit may include predicting at least one of a next charging timing and a charging station of the electric vehicle based on the charging information; and transmitting a notification regarding a congestion level of a predicted charging station to the electric vehicle or a user device at a timing prior to a predicted charging timing by a predetermined time.

The congestion level may be derived based on usage state prediction of the plurality of charging modules at the predicted charging timing.

Advantageous Effects

According to an exemplary embodiment of the present invention, a flexible power sharing operation is possible by the centrally controlled method to greatly improve the charging efficiency and speed.

Further, according to an exemplary embodiment of the present invention, data collected during the charging is learned and analyzed to build a vehicle model identification model so that a charging method customized for every vehicle model is provided to greatly improve the charging efficiency.

Further, according to the exemplary embodiment of the present invention, electric vehicle identification information is distinguished from data collected during the charging so that charging and payment information for every individual electric vehicle are collected and the pattern is analyzed. Moreover, a user customized charging and payment service may be provided based on the analysis result.

In addition, various effects according to the exemplary embodiment of the present invention are provided, which will be described in more detail with reference to the following drawings.

BRIEF DESCRIPTION OF DRAWINGS

FIGS. 4 and 5 are views illustrating a communication message collected by a central control unit from an electric vehicle according to an exemplary embodiment of the present invention.

FIG. 9 is a view illustrating a communication message including electric vehicle identification information according to an exemplary embodiment of the present invention.

DETAILED DESCRIPTIONS OF EXEMPLARY EMBODIMENTS

Figure 1:
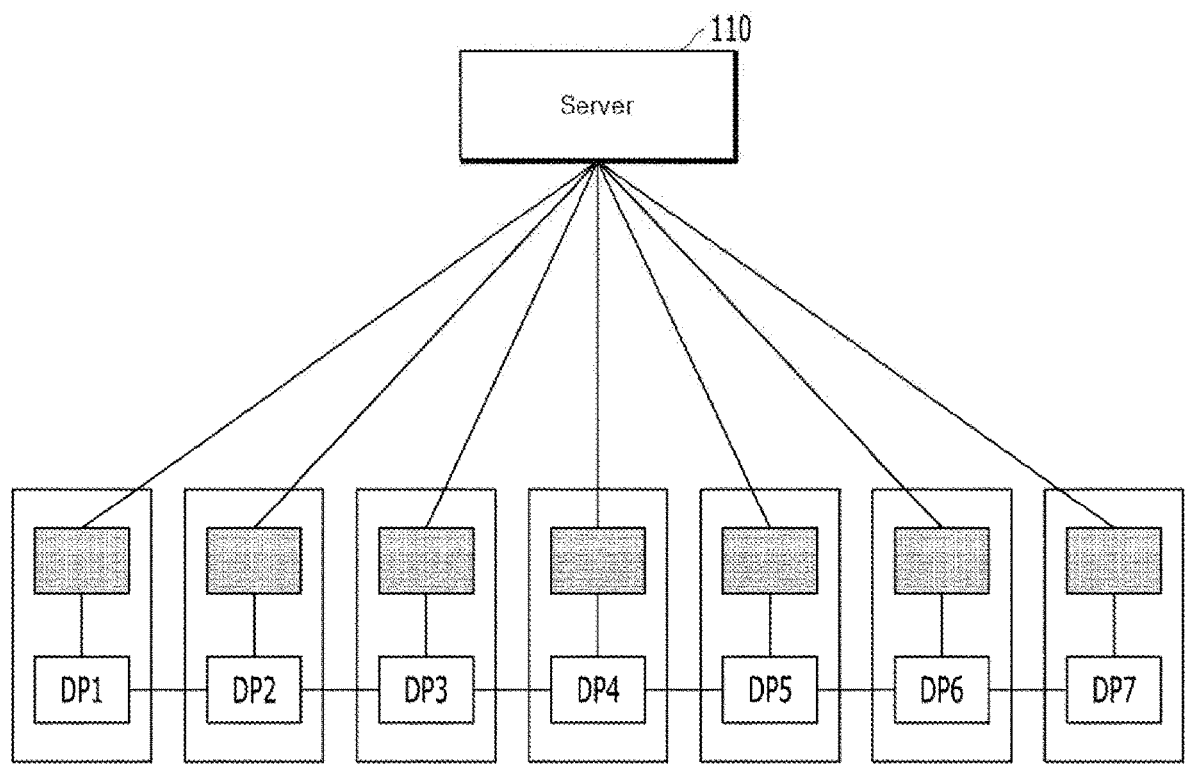
FIG. 1 illustrates an electric vehicle charging system of the related art.

The technique to be described below may be changed in various forms and may have various embodiments thereof, and thus specific embodiments will be illustrated in the drawings and described in detail in detailed description. However, this does not limit the technique to be described below within the specific exemplary embodiments, and it should be understood that the present invention covers all the modifications, equivalents and replacements within the spirit and technical scope of the technique to be described below.

Terms such as first, second, A, or B may be used to describe various components but the components are not limited by the above terms and are used only to distinguish one component from the other component. For example, without departing from the scope of the technique to be described below, a first component may be referred to as a second component, and similarly, a second component may be referred to as a first component. A term of and/or includes combination of a plurality of related elements or any one of the plurality of related elements. For example, "A and/or B" may be interpreted as "at least one of A and B". Further, "/" may be interpreted as "and" or "or".

With regard to the terms used in the specification, unless the context apparently indicates otherwise, it should be understood that the singular expression includes the plural expression, and it should be understood that terms "include" indicate that a feature, a number, a step, an operation, a component, a part or the combination those of described in the specification is present, but do not exclude a possibility of presence or addition of one or more other features, numbers, steps, operations, components, parts or combinations thereof, in advance.

Prior to detailed description for the drawings, it is intended to clarify that the components in the present specification are merely classified according to a main function of each component. That is, two or more components to be described below may be combined as one component or one component may be divided into two or more components for every subdivided function. In addition, each of the components to be described below may additionally perform a part or all the functions of the functions for the other components, as well as the main function that the components are responsible for and a part of the main function that each of the components is responsible for may be exclusively performed by the other component.

When a method or an operating is performed, processes which constitute the method may be performed in a different order from the mentioned order unless a specific order is clearly mentioned in context. That is, the processes may be performed in the order as described or simultaneously, or a reverse order.

Figure 2:
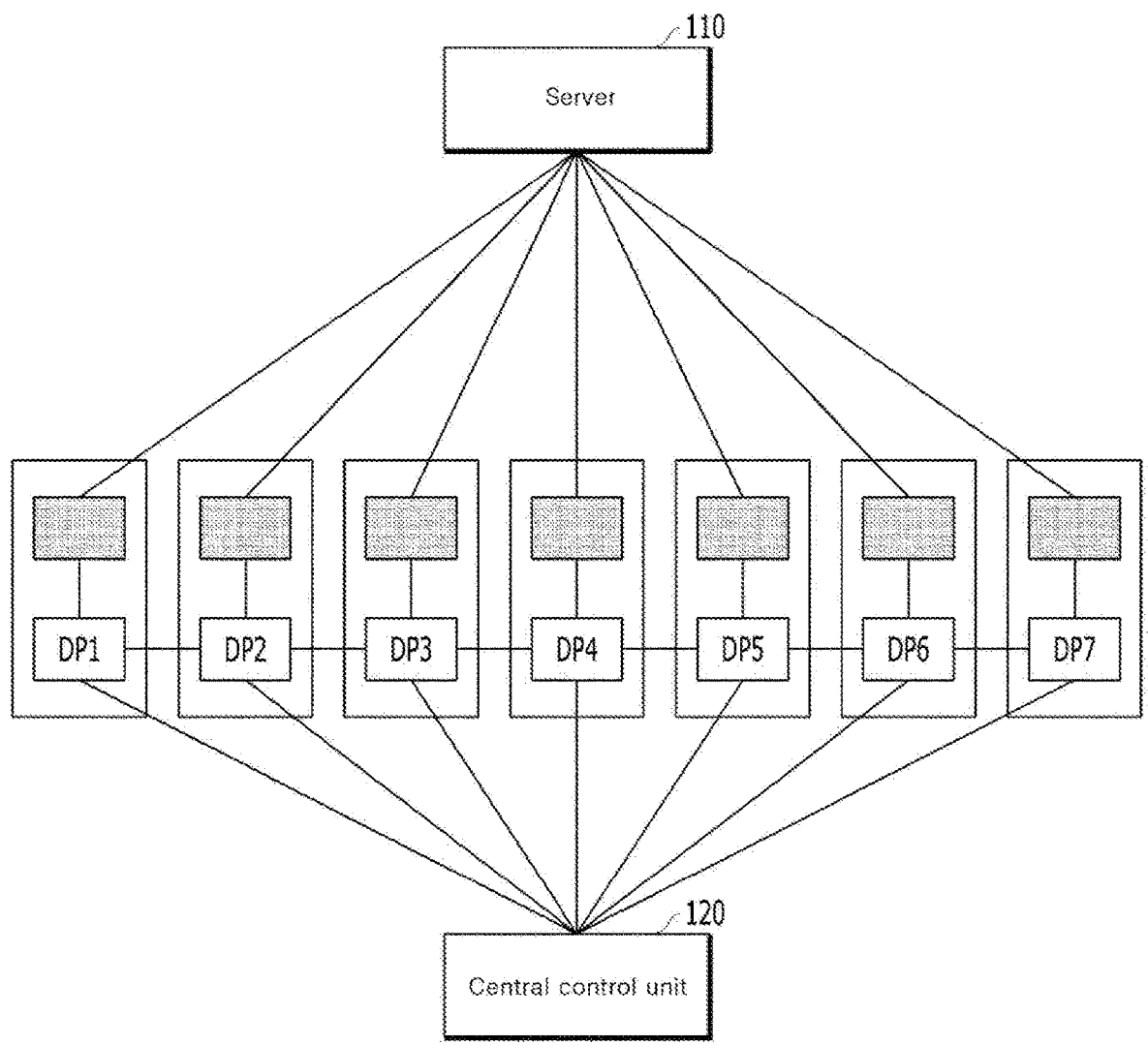
FIG. 2 is a view illustrating a big data based central control charging system according to an exemplary embodiment of the present invention.

FIG. 2 is a view illustrating a big data based central control charging system according to an exemplary embodiment of the present invention.

In order to solve the static power sharing problem of the electric vehicle charging system of the related art, the present disclosure proposes a central control charging system into which a central control unit is introduced.

The central control charging system proposed by the present disclosure further introduces a central control unit 120 as illustrated in the drawing and the central control unit communicates with a plurality of dispensers DP provided in an electric vehicle charging unit to perform a dynamic power sharing operation. Specifically, the central control unit 120 according to the exemplary embodiment of the present invention converts the charging data into big data and then analyzes and learns the big data of the charging data to perform a more efficient power sharing and charging operation. As a result, a limited function/efficiency of the electric vehicle charging system of the related art may be expanded.

A more specific power sharing operation of a central control charging system (specifically, a central control unit 120) will be described below in more detail with reference to the drawings.

Figure 3:
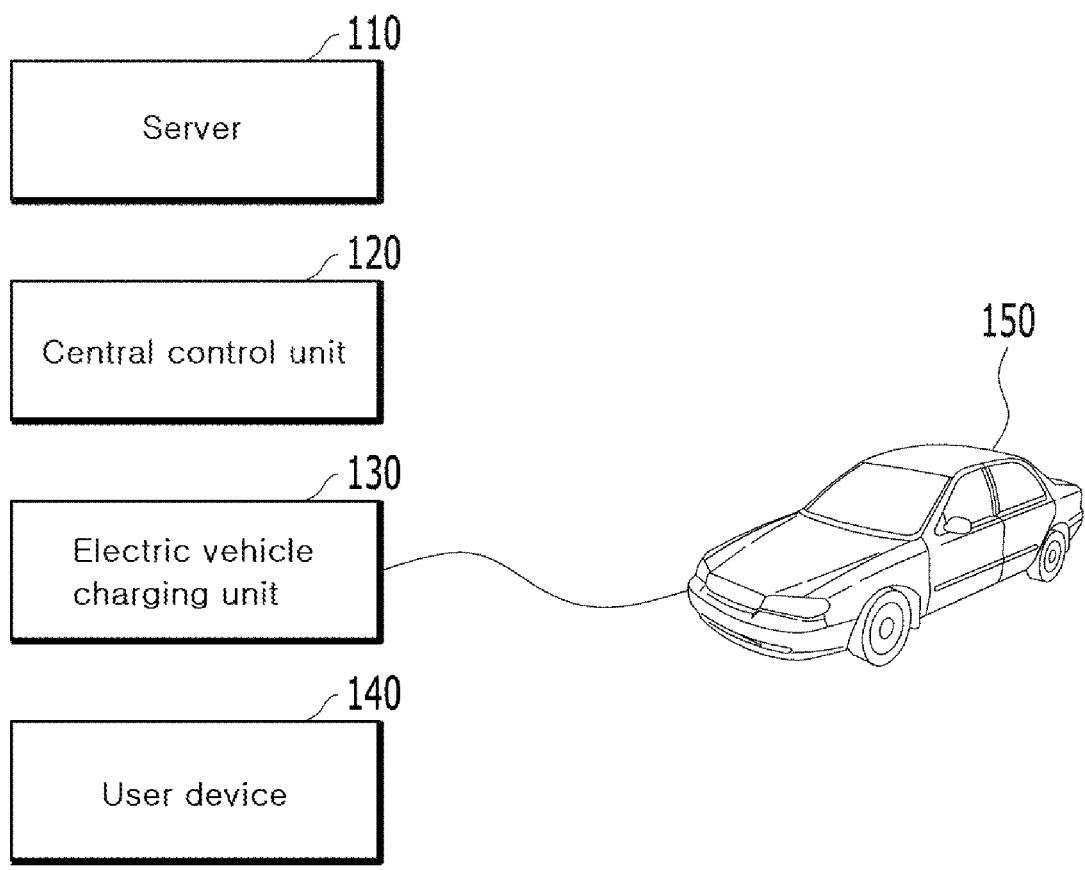
FIG. 3 is a block diagram illustrating a big data based central control charging system according to an exemplary embodiment of the present invention.

FIG. 3 is a block diagram illustrating a big data based central control charging system according to an exemplary embodiment of the present invention.

Referring to FIG. 3, a big data based central control charging system according to an exemplary embodiment of the present invention may include a server 110, a central control unit 120, an electric vehicle charging unit 130, an electric vehicle 150 and/or a user device 140.

The server 110 may correspond to a device/server which communicates with the electric vehicle charging unit 130 and/or the electric vehicle 150 to collect various information/data related to the charging therefrom. The server 110 performs communication or collects charging data according to a standardized communication protocol for the electric vehicle charging system 100. For example, the server 110 may perform communication according to the OCPP communication protocol to collect charging data.

The central control unit 120 communicates with the electric vehicle 150 and/or the electric vehicle charging unit 130 to not only collect various data related to a state of charge of the electric vehicle 150 which is being currently charged (that is, state-of-charge data), but also perform an efficient electric vehicle charging operation using the collected state-of-charge data.

For example, the central control unit 120 converts the collected state-of-charge data into big data and analyzes and learns the big data of the state-of-charge data to distinguish the electric vehicle model and applies the most appropriate charging method for the distinguished vehicle model to perform the charging. And/or, the central control unit 120 figures out a usage status of the charging module for every dispenser of the electric vehicle charging unit 130 based on the collected state-of-charge data in real time and may perform a dynamic power sharing operation of dynamically allocating the fully charged charging module of the dispenser to the other dispenser.

In addition, the central control unit 120 provides a customized charging service according to a vehicle model of the electric vehicle 150 and a charging/payment pattern of the user based on the collected state-of-charge data, which will be described below in more detail with reference to the drawings.

The electric vehicle charging unit 130 is a module/apparatus which charges the electric vehicle 150 and may include a plurality of charging modules and a plurality of dispensers. The plurality of charging modules is dynamically allocated to the dispensers by the control of the central control unit 120 based on a requested charging energy, a maximum chargeable energy, and an average charging speed of the electric vehicle 150 to be charged, to supply a charging power.

The electric vehicle 150 is connected to the electric vehicle charging unit 130 to be supplied with the electricity to be charged and may communicate with at least one configuration included in the electric vehicle charging system 100 of the present invention. Specifically, the electric vehicle 150 transmits information about a supply request power/current/voltage as state-of-charge data to the electric vehicle charging unit 130 to be supplied with a desired level of power/current/voltage from the electric vehicle charging unit 130. The electric vehicle may directly communicate only with the electric vehicle charging unit according to a specification which has been defined so far and indirectly communicate with the server and/or the central control unit by means of the electric vehicle charging unit. In the present disclosure, for the convenience of description, even though it is described that the electric vehicle communicates with the server and/or the central control unit, it may be actually interpreted to indirectly communicate therebetween by means of the electric vehicle charging unit.

The user device 140 refers to a terminal which is carried by a user of the electric vehicle to be charged and according to the exemplary embodiment, the user device may be included in the electric vehicle charging system 100 or not. The user device 140 mainly communicates with the central control unit 120 to receive various information/notifications related to the charging. Accordingly, the user device 140 may correspond to a terminal in which a previously designed application/program is installed to implement a function proposed in the present disclosure and various information/notifications related to the charging may be received by means of the application/program. Specifically, according to the exemplary embodiment, the central control unit 120 generates information about charging achievement, a congestion level of a charging station, and a charging cost based on the state-of-charge data to transmit the information to the user device 140.

As a premise for the operation, the central control unit 120 must have a function to individually identify the electric vehicle 150 which is currently being charged (when the electric vehicle 150 is recognized, the user device 140 matching the electric vehicle is also recognized), which will be described below in more detail with reference to FIGS. 9 and 10.

Figure 5:
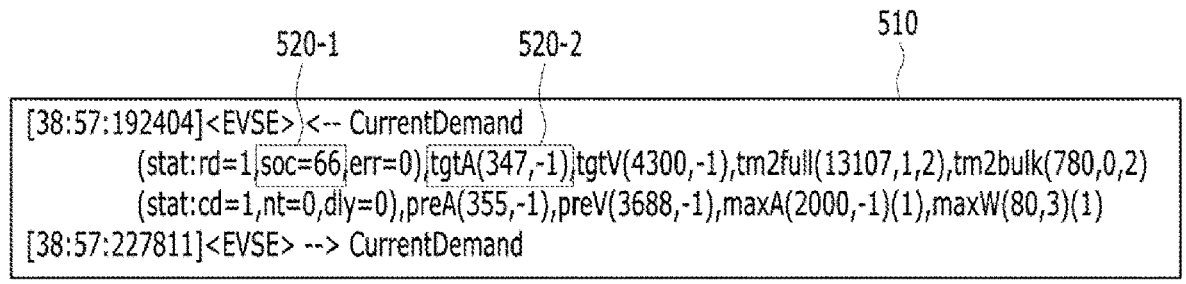
Figure 6:
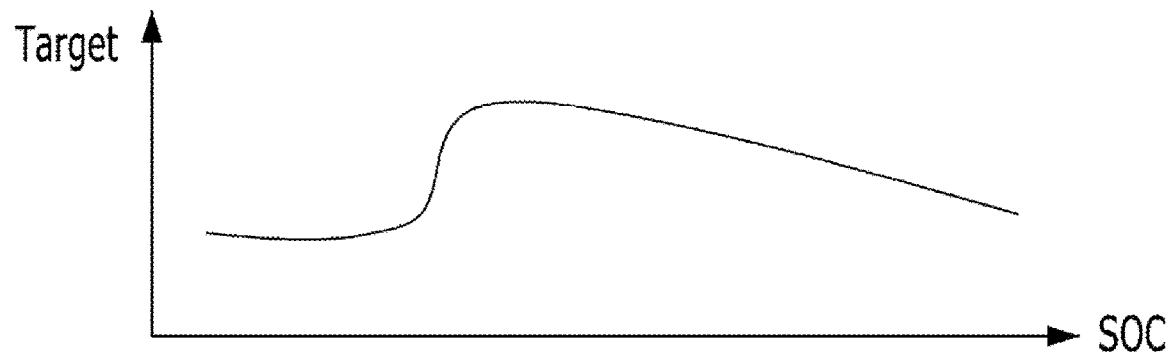
FIG. 6 is a view illustrating a target current variance graph with respect to a state of charge (SoC) which is defined in advance for a specific vehicle model according to an exemplary embodiment of the present invention.

FIGS. 4 and 5 are views illustrating a communication message of an electric vehicle collected by a central control unit according to an exemplary embodiment of the present invention. FIG. 6 is a view illustrating a target current variance graph with respect to a state of charge (SoC) which is defined in advance for a specific vehicle model according to an exemplary embodiment of the present invention.

Specifically, the communication messages 410 and 510 of FIGS. 4 and 5 are examples of communication messages which are transmitted by the electric vehicle, which is being charged, to the electric vehicle charging unit according to communication protocol DIN70121 or ISO15118. The electric vehicle and the electric vehicle charging unit transmit/receive a communication message including the state-of-charge data in real time during the charging as described above to share/negotiate the state of charge and the electric vehicle charging operation which is safe and appropriate for every situation may be performed by this operation.

However, it is understood from the communication message 410 illustrated in FIG. 4 that a data item to identify a vehicle model of the electric vehicle is not included anywhere. That is, in the electric vehicle charging system of the related art, when the communication was performed according to the standardized communication protocol, the server and the electric vehicle charging unit have no way to find out the vehicle model of the electric vehicle which was currently being charged. As a result, it was inevitable to apply a uniform charging method depending on the communication message 410 which was transmitted/received in real time.

However, actually, different optimal charging methods were defined for every vehicle model so that the uniform charging method in which the vehicle model was not considered acted as a major problem factor that lowered the charging speed and efficiency.

To be more specific, as illustrated in FIG. 5, the electric vehicle of the related art generally set the target current 520-2 according to the state of charge 520-1 and transmitted the communication message 510 including the data 520-1 and 520-2 to the electric vehicle charging unit. The electric vehicle charging unit passively controlled the number of charging modules used to charge based on the target current 520-2 of the communication messages transmitted by the electric vehicle to control an amount of supplied current. That is, the electric vehicle charging unit of the related art performed the passive power sharing operation to reduce the number of charging modules when the received target current 520-2 was reduced and increase the number of charging modules when the received target current 520-2 was increased.

However, as illustrated in FIG. 6, in fact, there are very many vehicle models having a charging routine in which the target current is set to be low in an initial period of a SoC and rises high in the middle/late period of the SoC. Accordingly, the charging modules were reduced according to the target current value of the initial period of SoC, but additional charging modules were not dynamically allocated even in the middle/late period due to the passive and static power sharing operation of the server so that there was a problem in that it did not increase to an intended target current.

The specific example thereof is as follows.
1. A first electric vehicle having a charging routine as illustrated in FIG. 6 reduces a target current at the initial SoC.
2. As the target current is lowered, the electric vehicle charging unit reduces the number of charging modules.
3. The first electric vehicle follows a lower current between a maximum current limit and a maximum supply current of the electric vehicle charging unit to set a target current in real time.
4. However, the maximum number of available charging modules of the electric vehicle charging unit is currently reduced so that the first electric vehicle may not adjust the target current to a sufficiently high level as desired according to an actual SoC-Target graph.
5. As a result, it is difficult to charge according to the SoC-Target graph desired by the first electric vehicle.

Figure 7:
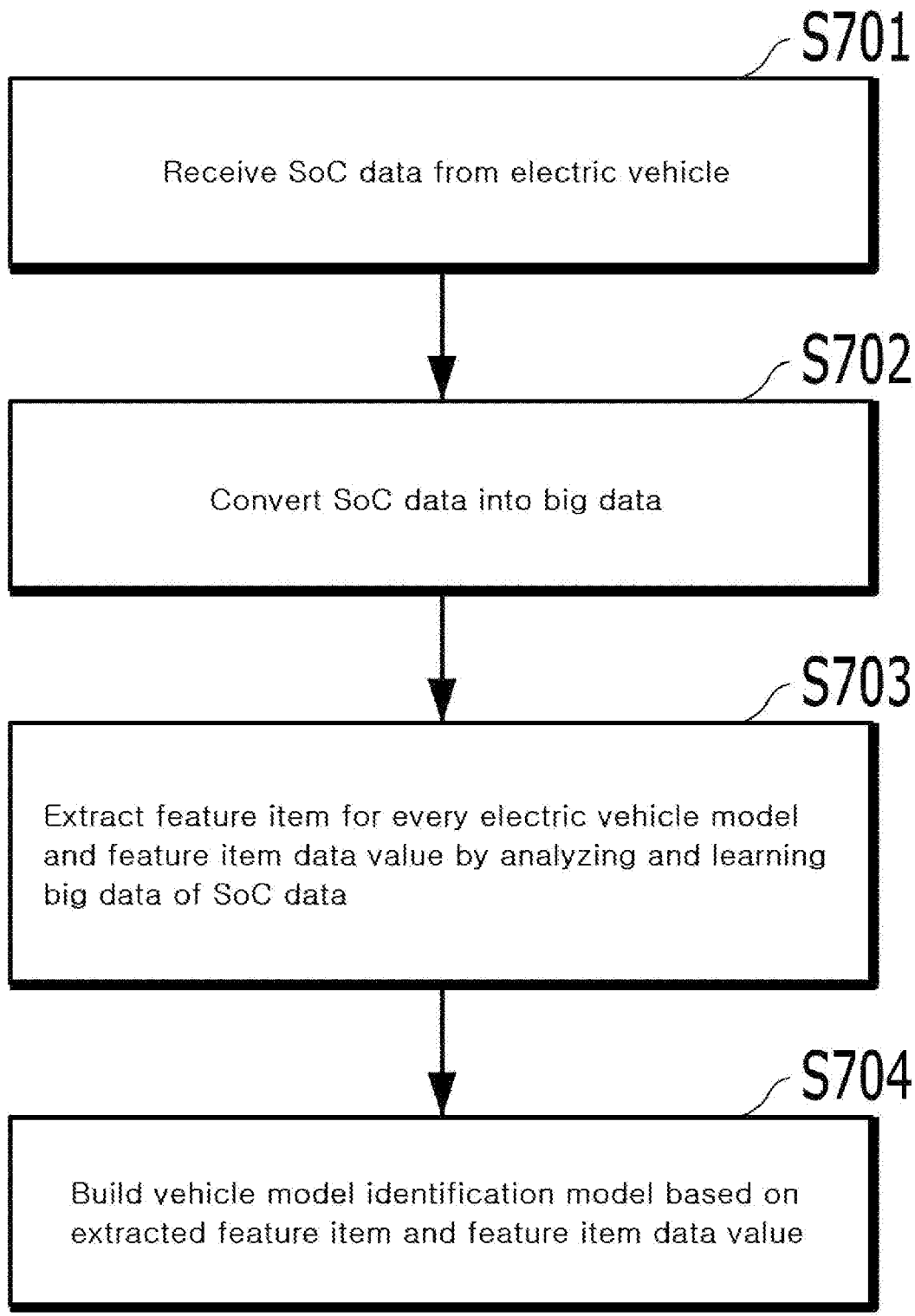
FIG. 7 is a flowchart illustrating a state-of-charge data analyzing and learning method of a central control unit according to an exemplary embodiment of the present invention.
Figure 8:
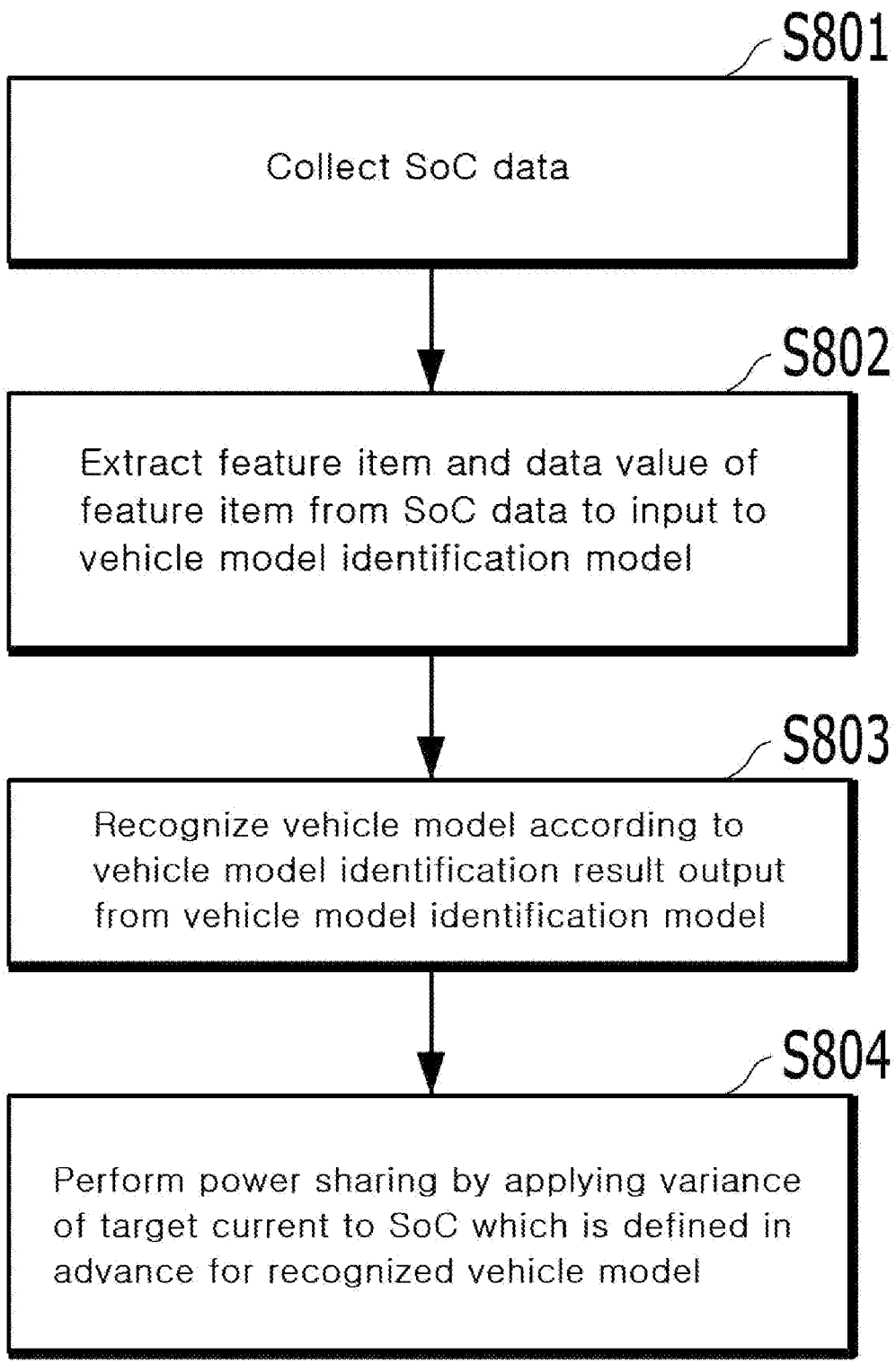
FIG. 8 is a flowchart illustrating a dynamic power sharing method of a central control unit according to an exemplary embodiment of the present invention.

Accordingly, in order to solve the above-described problem, the present disclosure proposes a dynamic power sharing embodiment of recognizing a vehicle model (see FIG. 7) by analyzing/learning state-of-charge data included in a communication message which is defined in advance and dynamically allocating a charging module according to SoC-Target graph which is defined in advance for the recognized vehicle (see FIG. 8).

FIG. 7 is a flowchart illustrating a state-of-charge data analyzing and learning method of a central control unit according to an exemplary embodiment of the present invention.

First, referring to FIG. 4 again, according to the existing communication protocol/standard protocol, a specific data item in the communication message are set to be different for every vehicle model to be transmitted to the central control unit by means of the electric vehicle charging unit. For example, a maximum available current value data item "EVMaximumCurrentLimit" 420 of the electric vehicles may correspond to the example, and in the case of the vehicle model "Bolt", the data item is set to 1500 and in the case of the vehicle model "Kona", the data item is set to 2000 to be transmitted. In addition, various data items, such as a maximum voltage limit of the electric vehicle, a maximum power limit, a scale value of the above value, an ID arrangement method, a bulk state of charge (SoC), a full SoC, a variance of a target current to SoC, a variance of a target current according to a temperature, a variance of a target current according to state of health (SoH), and/or an item for a message transmission speed for each communication step, are included in the communication message as state-of-charge data to be transmitted to the central control unit while being set to different data values for the vehicle models. The present disclosure proposes a method for extracting a specific item patterned for every vehicle model by learning and analyzing the state-of-charge data and recognizing a vehicle model based on a data value of the extracted specific item, in consideration thereof.

To be more specific, referring to FIG. 7, the central control unit may receive state-of-charge data through a communication message from the electric vehicle by means of the electric vehicle charging unit in S701. At this time, the communication message is generated according to a communication protocol (for example, OCPP, DIN70121, ISO15118) between the electric vehicle and the electric vehicle charging unit which is defined in a predetermined protocol/standard to be transmitted and received.

Next, the central control unit may convert the state-of-charge data included in the communication message received from the electric vehicle by means of the electric vehicle charging unit into big data in S702. Here, the conversion into big data may refer to a series of operations/processes performed by the central control unit to process as data to be learned and analyzed based on machine learning/deep learning technique.

Next, the central control unit analyzes and learns the big data of the state-of-charge data (based on the machine learning/deep learning technique) to extract feature items for every electric vehicle model and feature item data values in S703. Finally, the central control unit may build and/or update a vehicle model identification model to identify the electric vehicle model based on the extracted feature item and the feature item data value in S704. Here, when the feature item and the feature item data value are input, the vehicle model identification model may correspond to the algorithm modeled to output a matching vehicle model, and may correspond to a concept including a database in which feature item data values for every vehicle model are stored for each feature item.

An example of a method for building/updating the vehicle model identification model will be described in more detail. The central control unit may receive sample state-of-charge data for a specific electric vehicle model as state-of-charge data. The central control unit performs machine-learning based data mining on the sample state-of-charge data to extract a feature item which is commonly/specifically found from the sample state-of-charge data and a data value for the specific item. The central control unit sets the extracted feature item and the specific item data value as a condition/criterion for identifying the specific electric vehicle model to build and/or update the vehicle model identification model. As described above, the central control unit receives the sample state-of-charge data for various vehicle models to convert the sample state-of-charge data into big data to extract and utilize the feature item and the specific item data value to build and update the vehicle model identification model.

In addition, as described above, when there are a feature item for every vehicle model which has been already known and a data value corresponding thereto in the specific communication protocol, a system manager/operator directly inputs them to directly build and/or update the vehicle model identification model.

According to the exemplary embodiment, the central control unit identifies a vehicle model while maintaining a compatibility with the existing system and the communication protocol and as a result, there is an effect of providing a foothold for performing the dynamic power sharing operation according the SoC-target current variance which is defined in advance for every vehicle model. Further, according to the exemplary embodiment, the central control unit analyzes and learns the transmitted/received state-of-charge data in real time to dynamically update the vehicle model identification model so that even though a new vehicle model occurs, a communication protocol/communication is updated, a data item for every vehicle model and a setting value therefor are changed, the vehicle model may be identified with a high accuracy.

FIG. 8 is a flowchart illustrating a dynamic power sharing method of a central control unit according to an exemplary embodiment of the present invention.

The flowchart assumes that the vehicle model identification model has been built in advance according to the exemplary embodiment of FIG. 7 and a plurality of electric vehicles is connected to the electric vehicle charging unit.

Referring to FIG. 8, the central control unit receives the communication message from the plurality of electric vehicles which is being charged by means of the electric vehicle charging unit to collect the state-of-charge data in real time/periodically in S801.

Next, the central control unit extracts the feature item and the data value for the feature item from the state-of-charge data collected for every electric vehicle to input the feature item and the data value to the vehicle model identification model in S802. The vehicle model identification model recognizes the vehicle model matching the input feature item and the data value of the feature item and may output the recognized vehicle model.

Next, the central control unit may recognize the vehicle models of the plurality of electric vehicles according to the vehicle model identification result output from the vehicle model identification model in S803.

Finally, the central control unit applies the variance (for example, the graph of FIG. 6) of the target current to the SoC which is defined in advance for every recognized vehicle model to the electric vehicle charging unit of each electric vehicle to perform the dynamic power sharing operation. To be more specific, the central control unit dynamically allocates the plurality of charging modules to every electric vehicle according to the target current variance to the SoC which has been defined in advance for each of the plurality of electric vehicles to perform the power sharing operation. At this time, the central control unit may obtain the target current variance to the SoC by previously inputting the target current variance to the SoC which has been defined in advance for every vehicle model from the system manager/operator or directly analyzing/learning/recording the target current variance to the SoC included in the state-of-charge data (see a communication message of FIG. 5) received for every vehicle model.

When the dynamic power sharing operation according to the exemplary embodiment is performed, the electric vehicle charging unit dynamically allocates the charging modules according to the target current variance to the SoC which is defined in advance without depending on the target current value transmitted from the electric vehicle. Therefore, as illustrated in FIG. 6, the charging module is additionally allocated even to an electric vehicle in which a target current of the initial SoC period is set to low as much as a target current in the middle/late period so that more efficient power sharing operation than that of the related art is possible.

However, the electric vehicle having a charging routine/pattern in which the target current of the initial SoC period is set to be higher than that in the middle and/or late period does not have the above-described problem. Therefore, as illustrated in FIG. 6, the power sharing operation may be restrictively applied only to the electric vehicle in which the target current value of the SoC initial period is set to be lower than that in the mid and/or late period.

In the above-described exemplary embodiment, the target current variance to the SoC which has been defined in advance for every vehicle model has been mainly described, but the present disclosure is not limited thereto so that the dynamic power sharing operation which considers the additional element/factor affecting the determination of the target current amount, such as a temperature and/or SoH may also be possible. For example, an actual target current amount of the electric vehicle may be determined by collectively considering various elements/factors such as a current temperature of the electric vehicle or SoH, as well as the SoC. Taking this into consideration, the central control unit converts variance data of the target current to the temperature and/or the SoH of the electric vehicle into big data and learns the big data and directly builds/defines the target current variance to the temperature and/or the SoH for every vehicle model based on the learning contents/result and then may perform the power sharing operation for every vehicle model based thereon.

Figure 10:
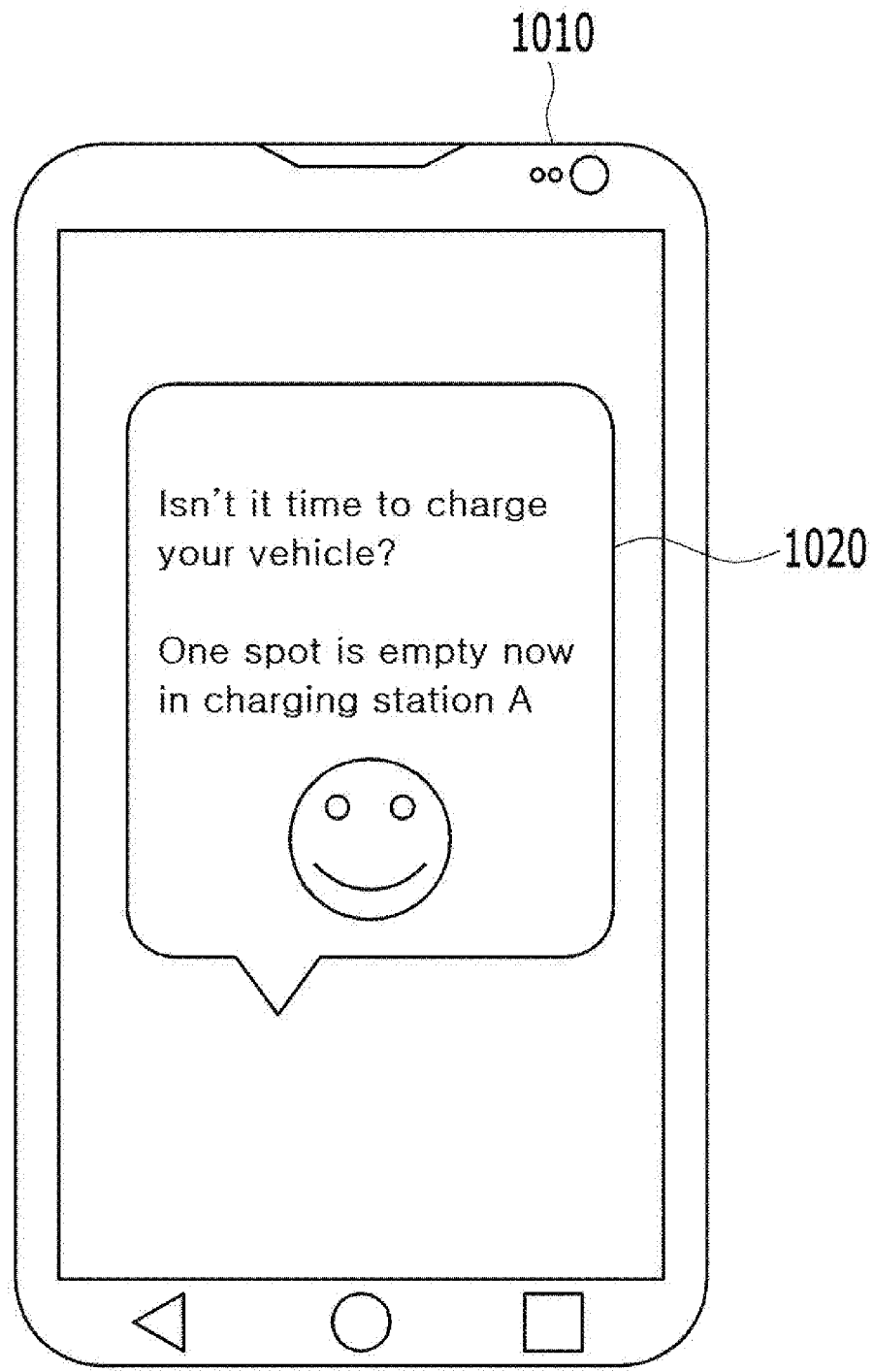
FIG. 10 is a view illustrating a user device which provides charging related service based on electric vehicle identification information.

FIG. 9 is a view illustrating a communication message including electric vehicle identification information according to an exemplary embodiment of the present invention and FIG. 10 is a view illustrating a user device which provides charging related service based on electric vehicle identification information.

The communication message may include a different data item for every individual electric vehicle. For example, as illustrated in FIG. 9, the communication message 910 may include a media access control address (MAC) data item ('SessionID') 920 and this data item may be set to a different data value for every electric vehicle to be transmitted. Accordingly, the central control unit may utilize the data item and the data value as information for identifying the individual electric vehicle.

The identification information is also directly set by the system manager/operator or automatically recognized/acquired by the central control unit by analyzing and learning the SoC data according to the exemplary embodiment described in detail with reference to FIG. 7 above. When the identification information automatically recognizes/acquires the SoC data, the central control unit selects the state-of-charge data of the same vehicle model from the big data of the SoC data and compares the selected state-of-charge data to extract a data item different for every electric vehicle as an identification item. The central control unit may identify the individual electric vehicles using the identification data value of the identification item extracted as described above.

The central control unit acquires and stores the charging and payment information for each electric vehicle using the same identification information to utilize the information for various charging related services. To be more specific, the central control unit collects/acquires various charging and payment information from each electric vehicle and may store the collected/acquired information in the database so as to correspond to identification information (specifically, an identification data value) of each electric vehicle.

Here, the charging information refers to various information relate to the charging of the electric vehicle and for example, may correspond to a charging station location in which the electric vehicle is charged, an average charging amount of the electric vehicle, a maximum charging amount, a minimum charging amount, an average charging time, a minimum charging time, a maximum charging time, a charging period, the number of times and/or date. The payment information refers to information of charging payment details of the electric vehicle and for example, may correspond to a payment card used to pay for charging the electric vehicle, a payment account, payment method information and/or user's personal information.

The central control unit converts the charging and/or payment information of the electric vehicle which are stored as described above into the big data to learn and analyze and as a result, extracts the charging and/or payment pattern/feature/routine of each electric vehicle (or user) and may provide various charging services based thereon.

For example, when the entire payment method for the first electric vehicle is set to an automatic payment method, the central control unit may automatically make the payment for a charging cost based on the payment information which is stored in advance for the first electric vehicle when the first electric vehicle is fully charged.

As another example, the central control unit may predict a next charging timing and a charging station based on the charging information of the first electric vehicle and may transmit a notification 1020 regarding a congestion level of the predicted charging station to the user device 1010 (or the first electric vehicle) at a predetermined time earlier than the predicted charging timing by the predetermined time, as illustrated in FIG. 10. Here, the congestion level may refer to a congestion level of the charging station and basically, derived based on the usage state prediction of the charging module at a predicted charging timing. The usage state of the charging module at the predicted charging timing may be predicted based on the SoC-target current variance of the electric vehicle which is currently being charged.

Figure 11:
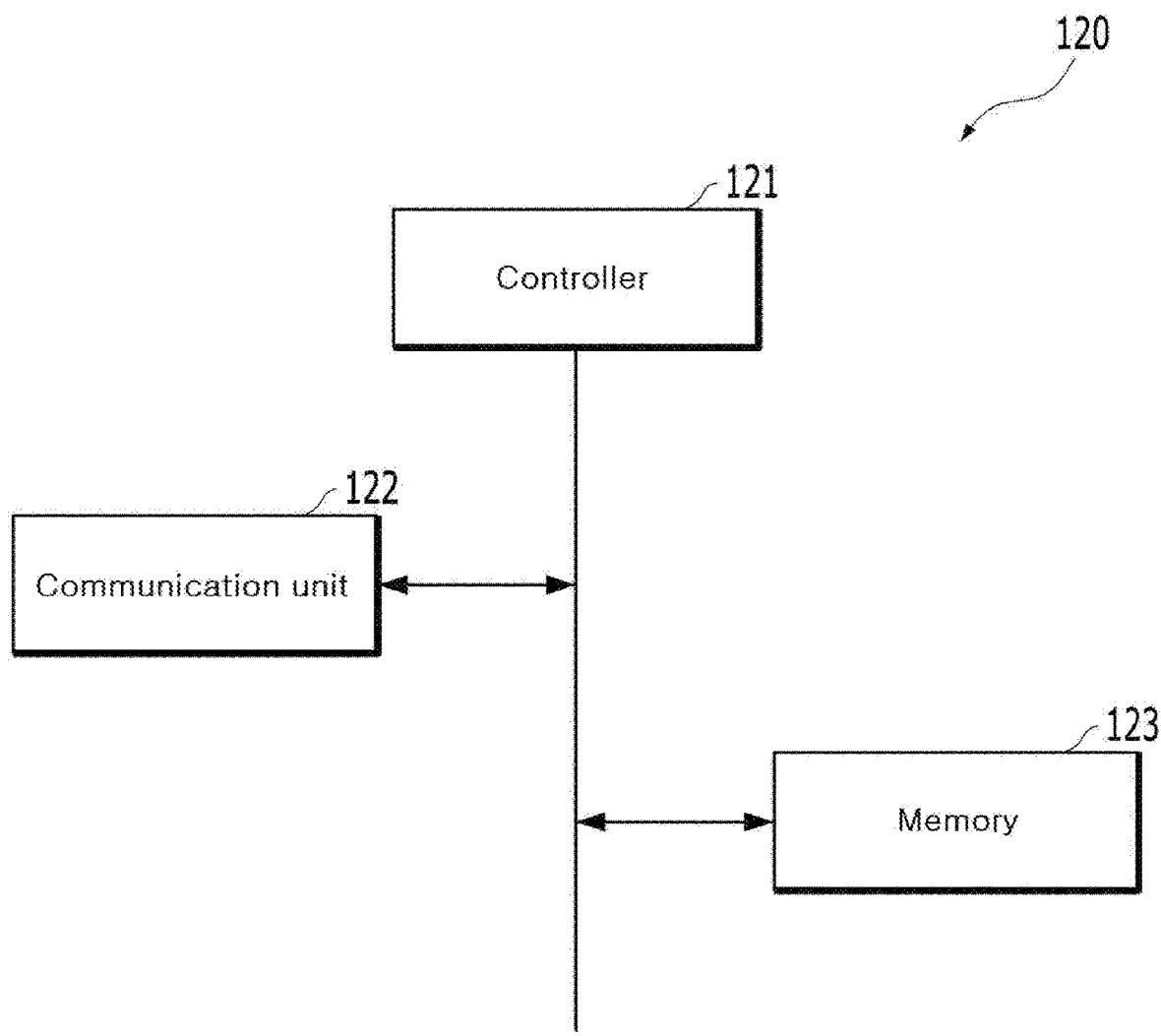
FIG. 11 is a block diagram of a central control unit according to an exemplary embodiment of the present invention.

FIG. 11 is a block diagram of a central control unit according to an exemplary embodiment of the present invention.

Referring to FIG. 11, the central control unit 120 according to the exemplary embodiment of the present disclosure may include a controller 121, a communication unit 122, and/or a memory unit 123.

The controller 121 performs the communication with the other components included in the central control unit 120 to control the other components to carry out the exemplary embodiment proposed in the present disclosure. The controller 121 may be configured to include at least one of a central processing unit (CPU), a microprocessor unit (MPU), a micro controller unit (MCU), an application processor (AP), and an arbitrary processor which is well known in the technical field of the present disclosure. Accordingly, in the present disclosure, the central control unit 120 may be described by being replaced with the controller 121.

Specifically, the controller 121 may perform an operation of analyzing and updating the vehicle model identification model by analyzing and learning the collected state-of-charge data after converting the collected state-of-charge data into the big data. At this time, the controller 121 may utilize at least one of machine learning, deep learning, and data mining.

The communication unit 122 may perform the communication with an external device/configuration/server using at least one wired/wireless communication protocol. Specifically, the communication unit 122 may perform the communication according to the electric vehicle communication protocol/standard protocol (for example, OCPP) which is defined/set in advance for the electric vehicle communication and transmit/receive a communication message including state-of-charge data for every data item which is defined in advance to and from the electric vehicle, the electric vehicle charging unit and/or the server.

The memory unit 123 may correspond to a space in which various digital data is stored and for example, may refer to a flash memory, a hard disk drive (HDD), a solid state drive (SSD), or a cloud. In the memory unit 123, a database in which data for carrying out the exemplary embodiment proposed in the present disclosure is stored may be built. For example, in the database, various data, such as a feature item for identifying a vehicle model, a feature item data value for every vehicle model, and a data value for building and/or updating vehicle model identification modeling, may be stored. Further, in the database, an identification item of each electric vehicle, an identification item data value for every electric vehicle, charging information, and/or payment information may also be stored.

The exemplary embodiment according to the present invention may be implemented by various means, for example, a hardware, a firmware, a software, and a combination thereof. When the exemplary embodiment is implemented by the hardware, the exemplary embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a microcontroller, or a microprocessor.

Further, when the exemplary embodiment is implemented by firmware or software, the exemplary embodiment of the present invention is implemented as a module, a procedure, or a function which performs functions or operations described above to be recorded in a computer readable media by means of various computer means. The recording medium may include solely a program instruction, a data file, and a data structure or a combination thereof. The program instruction recorded in the recording medium may be specifically designed or constructed for the present disclosure or known to those skilled in the art of a computer software to be used. For example, the recording medium includes a hardware device which is specifically configured to store and execute a program instruction, such as a magnetic media such as a hard disk, a floppy disk, and a magnetic tape, an optical media such as a compact disk read only memory (CD-ROM) or a digital video disk (DVD), a magneto-optical media such as a floptical disk, a ROM, a random access memory (RAM), and a flash memory. Examples of the program command include not only a machine language code which is created by a compiler but also a high level language code which may be executed by a computer using an interpreter. The hardware device may operate as one or more software modules in order to perform the operation of the present disclosure and vice versa.

Further, the device or the terminal according to the present invention may be driven by an instruction which causes one or more processors to perform the above-described functions and processes. For example, such an instruction may include an interpreted instruction such as a script instruction including JavaScript or ECMAScript instruction, an executable code or other instructions stored in a computer readable media. Moreover, the device according to the present invention may be implemented as a distributed type over a network, such as a server farm, or may be implemented in a single computer device.

Further, the computer program (also known as a program, software, a software application, a script, or a code) which is installed in the apparatus according to the present invention and executes the method according to the present invention may be written in any form of programming languages, including compiled or interpreted languages or intuitive or procedural languages or deployed in any form including standalone programs, modules, components, or other units suitable for use in a sub-routine or a computer environment. The computer program does not necessarily correspond to a file of the file system. The program may be stored in a single file provided to the requested program, or multiple interactive files (for example, a file storing one or more modules, sub programs, or a part of the code), or a part of a file containing other program or data (for example, one or more scripts stored in a mark-up language document). The computer program is located at one site or distributed over a plurality of sites to be deployed to be executed on multiple computers which are interconnected by a communication network or one computer.

For the convenience of description, even though the drawings have been separately described, exemplary embodiments illustrated in the drawings are designed to be merged to implement a new exemplary embodiment. Further, the present invention is not configured to limitatively apply the configuration and the method of the exemplary embodiments described above, but all or some of the respective embodiments may be selectively combined so as to achieve various modifications.

Exemplary embodiments of the present invention have been illustrated and described above, but the present invention is not limited to the above-described specific embodiments, it is obvious that various modification may be made by those skilled in the art, to which the present invention pertains without departing from the gist of the present invention, which is claimed in the claims, and such modification should not be individually understood from the technical spirit or prospect of the present invention.

INDUSTRIAL APPLICABILITY

The present disclosure is applicable to an industry of the electric vehicle.

The invention claimed is:

1. A big data based central control charging system, comprising:
  an electric vehicle charging unit which charges an electric vehicle using a plurality of charging modules; and
  a central controller which collects state-of-charge (SOC) data by performing communication with the electric vehicle, by means of the electric vehicle charging unit,
  wherein the central controller converts SOC data received from the electric vehicle, by means of the electric vehicle charging unit, into big data, extracts a feature item for each electric vehicle model and a data value of the feature item by analyzing and learning the big data of the SOC data, builds or updates a vehicle model identification model for identifying the electric vehicle model based on the extracted feature item and the feature item data value, selects SOC data of the same vehicle model, among the big data of the SOC data, compares the selected SOC data for each electric vehicle to extract different identification items, and stores charging and payment information for each electric vehicle in the database by matching an identification data value of one of the identification items, wherein the central controller applies a vehicle model specific variance of a target current to SoC for charging-control, the value of the target current in a first SoC period is lower than the value of the target current in a second SoC period and the value of the target current in a third SoC period, the first SoC period is from a beginning point to a first predetermined point in an entire SoC period, the second SoC period is from the first predetermined point to a second predetermined point in the entire SoC period, the third SoC period is from the second predetermined point to an end point in the entire SoC period, the vehicle model specific variance of the target current is defined for each vehicle model by analyzing and learning the big data of the SOC data, and the feature item includes a maximum current limit, a maximum voltage limit, a maximum power limit, a scale value, an identifier (ID) arrangement method, a bulk SoC, a full SoC, a variance of the target current to the SoC, a variance of the target current according to a temperature, a variance of the target current according to a state of health (SoH), and a message transmission speed for the electric vehicle.

2. The big data based central control charging system of claim 1, wherein the central controller receives sample SOC data for a specific electric vehicle model as the SOC data, extracts a feature item for the electric vehicle model and a data value of the feature item by performing machine-learning based data mining on the sample SOC data.

3. The big data based central control charging system of claim 1, wherein the identification item of the electric vehicle corresponds to a media access control (MAC) address of the electric vehicle.

4. The big data based central control charging system of claim 1, wherein charging information of the electric vehicle includes at least one of a charging station location in which the electric vehicle is charged, an average charging amount of the electric vehicle, a maximum charging amount, a minimum charging amount, an average charging time, a minimum charging time, a maximum charging time, a charging period, the number of charging times, and charging dates, and the payment information of the electric vehicle includes at least one of a payment card used for payment for charging of the electric vehicle, a payment account, payment method information, and user information.

5. The big data based central control charging system of claim 4, wherein when a payment method for the electric vehicle is set to an automatic payment method, the central controller automatically makes a payment for a charging cost based on the payment information when the electric vehicle is fully charged.

6. The big data based central control charging system of claim 4, wherein the central controller predicts at least one of a next charging timing and a charging station of the electric vehicle based on the charging information and transmits a notification for a congestion level of a predicted charging station to the electric vehicle or a user device at a predetermined time earlier than a predicted charging timing.

7. The big data based central control charging system of claim 6, wherein the congestion level is derived based on usage state prediction of the plurality of charging modules at the predicted charging timing.

8. A big data based central control charging system, comprising:

an electric vehicle charging unit which charges an electric vehicle using a plurality of charging modules; and a central controller which collects state-of-charge (SOC) data by performing communication with the electric vehicle, by means of the electric vehicle charging unit, wherein the central controller converts SOC data received from the electric vehicle, by means of the electric vehicle charging unit, into big data, extracts a feature item for each electric vehicle model and a data value of the feature item by analyzing and learning the big data of the SOC data, builds or updates a vehicle model identification model for identifying the electric vehicle model based on the extracted feature item and the feature item data value, when a plurality of electric vehicles is connected to the electric vehicle charging unit to start the charging after building the vehicle model identification model, the central controller collects SOC data by performing communication with the plurality of electric vehicles, extracts the feature item and the feature item data value from the SOC data to input the feature item and the feature item data value to the vehicle model identification model, recognizes vehicle models of the plurality of electric vehicles according to a vehicle model identification result output from the vehicle model identification model, and controls the charging for the plurality of electric vehicles by applying a vehicle model specific variance of a target current to SoC which is defined in advance for each recognized vehicle model to the electric vehicle charging unit, wherein the central controller applies the vehicle model specific variance of a target current to SoC for charging-control, the value of the target current in a first SoC period is lower than the value of the target current in a second SoC period and the value of the target current in a third SoC period, the first SoC period is from a beginning point to a first predetermined point in an entire SoC period, the second SoC period is from the first predetermined point to a second predetermined point in the entire SoC period, the third SoC period is from the second predetermined point to an end point in the entire SoC period, the vehicle model specific variance of the target current is defined for each vehicle model by analyzing and learning the big data of the SOC data, and the feature item includes a maximum current limit of the electric vehicle, a maximum voltage limit, a maximum power limit, a scale value, an identifier (ID) arrangement method, a bulk SoC, a full SoC, a variance of the target current for the SoC, a variance of the target current according to a temperature, a variance of the target current according to a state of health (SoH) and a message transmission speed.

9. The big data based central control charging system of claim 8, wherein the central controller receives sample SOC data for a specific electric vehicle model as the SOC data, extracts a feature item for the electric vehicle model and a data value of the feature item by performing machine-learning based data mining on the sample SOC data.

10. The big data based central control charging system of claim 8, wherein the central controller performs a power sharing operation by dynamically allocating the plurality of charging modules for each electric vehicle according to the vehicle model specific variance of the target current to SoC which is defined in advance for each vehicle model of the plurality of electric vehicles.

11. A charging control method of a central controller, comprising:
receiving state-of-charge (SOC) data from an electric vehicle connected to an electric vehicle charging unit, by means of the electric vehicle charging unit;
converting the received SOC data into big data;
extracting a feature item for each electric vehicle model and a data value of the feature item by analyzing and learning the big data of the SOC data;
building or updating a vehicle model identification model for identifying the electric vehicle model based on the extracted feature item and the feature item data value;
collecting SOC data by performing communication with a plurality of electric vehicles when the plurality of electric vehicles is connected to the electric vehicle charging unit to start the charging after building the vehicle model identification model;
extracting the feature item and the feature item data value from the SOC data to input the feature item and the feature item data value to the vehicle model identification model;
recognizing vehicle models of the plurality of electric vehicles according to a vehicle model identification result output from the vehicle model identification model; and
controlling the charging for the plurality of electric vehicles by applying a vehicle model specific variance of a target current to SoC which is defined in advance for each recognized vehicle model to the electric vehicle charging unit,
wherein
in order to apply the vehicle model specific variance of a target current to SoC, the method further comprises determining that the value of the target current in a first SoC period is lower than the value of the target current in a second SoC period and the value of the target current in a third SoC period,
the first SoC period is from a beginning point to a first predetermined point in an entire SoC period,
the second SoC period is from the first predetermined point to a second predetermined point in the entire SoC period,
the third SoC period is from the second predetermined point to an end point in the entire SoC period,
the vehicle model specific variance of the target current is defined for each vehicle model by analyzing and learning the big data of the SOC data, and
the feature item includes a maximum current limit of the electric vehicle, a maximum voltage limit, a maximum power limit, a scale value, an identifier (ID) arrangement method, a bulk SoC, a full SoC, a variance of the target current for the SoC, a variance of the target current according to a temperature, a variance of the target current according to a state of health (SoH), and a message transmission speed.

12. The charging control method of a central controller of claim 11, further comprising:
receiving sample SOC data for a specific electric vehicle model as the SOC data; and
extracting a feature item for the electric vehicle model and a data value of the feature item by performing machine-learning based data mining on the sample SOC data.

13. The charging control method of a central controller of claim 11, further comprising:
performing a power sharing operation by dynamically allocating the plurality of charging modules for each electric vehicle according to the vehicle model specific variance of the target current to SoC which is defined in advance for each vehicle model of the plurality of electric vehicles.

14. A charging control method of a central controller, comprising:
receiving state-of-charge (SOC) data from an electric vehicle connected to an electric vehicle charging unit, by means of the electric vehicle charging unit;
converting the received SOC data into big data;
extracting a feature item for each electric vehicle model and a data value of the feature item by analyzing and learning the big data of the SOC data;
building or updating a vehicle model identification model for identifying the electric vehicle model based on the extracted feature item and the feature item data value;
selecting SOC data of the same vehicle model, among the big data of the SOC data;
comparing the selected SOC data for each electric vehicle to extract different identification items; and
storing charging and payment information for each electric vehicle in the database by matching an identification data value of one of the identification items,
wherein
the central controller applies a vehicle model specific variance of a target current to SoC for charging-control,
the value of the target current in a first SoC period is lower than the value of the target current in a second SoC period and the value of the target current in a third SoC period,
the first SoC period is from a beginning point to a first predetermined point in an entire SoC period,
the second SoC period is from the first predetermined point to a second predetermined point in the entire SoC period,
the third SoC period is from the second predetermined point to an end point in the entire SoC period,
the vehicle model specific variance of the target current is defined for each vehicle model by analyzing and learning the big data of the SOC data, and
the feature item includes a maximum current limit of the electric vehicle, a maximum voltage limit, a maximum power limit, a scale value an identifier (ID) arrangement method, a bulk SoC, a full SoC, a variance of the target current for the SoC, a variance of the target current according to a temperature, a variance of the target current according to a state of health (SoH), and a message transmission speed.

15. The charging control method of a central controller of claim 14, further comprising:
receiving sample SOC data for a specific electric vehicle model as the SOC data; and extracting a feature item for the electric vehicle model and a data value of the feature item by performing machine-learning based data mining on the sample SOC data.

16. The charging control method of a central controller of claim 14, wherein the identification item of the electric vehicle corresponds to a media access control (MAC) address of the electric vehicle.

17. The charging control method of a central controller of claim 14, wherein the charging information of the electric vehicle includes at least one of a charging station location in which the electric vehicle is charged, an average charging amount of the electric vehicle, a maximum charging amount, a minimum charging amount, an average charging time, a minimum charging time, a maximum charging time, a charging period, the number of charging times, and charging dates, and the payment information of the electric vehicle includes at least one of a payment card used for payment for charging of the electric vehicle, a payment account, payment method information, and user information.

18. The charging control method of a central controller of claim 17, further comprising:

when a payment method for the electric vehicle is set to an automatic payment method, automatically making a payment for a charging cost based on the payment information when the electric vehicle is fully charged.

19. The charging control method of a central controller of claim 17, further comprising:

predicting at least one of a next charging timing and a charging station of the electric vehicle based on the charging information; and transmitting a notification regarding a congestion level of a predicted charging station to the electric vehicle or a user device at a predetermined time earlier than a predicted charging timing.

20. The charging control method of a central controller of claim 19, wherein the congestion level is derived based on usage state prediction of the plurality of charging modules at the predicted charging timing.

* * * * *